(12) United States Patent
Jordil et al.

(10) Patent No.: US 7,415,775 B2
(45) Date of Patent: Aug. 26, 2008

(54) ORIENTABLE PROBE

(75) Inventors: Pascal Jordil, Ecoteaux (CH); Claude Rouge, Baulmes (CH)

(73) Assignee: TESA SA, Renens (CH)

( * ) Notice: Subject to any disclaimer, the term of this patent is extended or adjusted under 35 U.S.C. 154(b) by 0 days.

(21) Appl. No.: 11/180,322

(22) Filed: Jul. 13, 2005

(65) Prior Publication Data

US 2006/0010701 A1    Jan. 19, 2006

(30) Foreign Application Priority Data

Jul. 16, 2004    (EP) .................................. 04103417

(51) Int. Cl.
*G01B 5/00*    (2006.01)
*G01B 5/012*    (2006.01)

(52) U.S. Cl. .......................................... 33/559; 33/556
(58) Field of Classification Search .................. 33/559, 33/556, 558, 561
See application file for complete search history.

(56) References Cited

U.S. PATENT DOCUMENTS

| 3,478,436 | A | * | 11/1969 | Barnes | 33/503 |
| 3,531,868 | A | * | 10/1970 | Stevenson | 33/503 |
| 3,678,584 | A | * | 7/1972 | Dolan | 33/559 |
| 4,888,877 | A | | 12/1989 | Enderle et al. | 33/559 |
| 5,138,563 | A | * | 8/1992 | Debitsch et al. | 702/95 |
| 5,410,817 | A | * | 5/1995 | Kish | 33/559 |
| 5,675,902 | A | * | 10/1997 | Chase | 33/559 |
| 5,808,888 | A | * | 9/1998 | Susnjara et al. | 700/86 |
| 5,829,148 | A | * | 11/1998 | Eaton | 33/503 |
| 6,546,643 | B2 | * | 4/2003 | Lotze et al. | 33/559 |
| 6,854,193 | B2 | * | 2/2005 | Lotze | 33/502 |
| 6,931,745 | B2 | * | 8/2005 | Granger | 33/503 |
| 7,036,238 | B2 | * | 5/2006 | Kojima et al. | 33/503 |
| 7,051,447 | B2 | * | 5/2006 | Kikuchi et al. | 33/503 |
| 7,100,297 | B2 | * | 9/2006 | McMurtry et al. | 33/556 |
| 7,197,835 | B2 | * | 4/2007 | Takanashi | 33/503 |
| 2001/0025427 | A1 | | 10/2001 | Lotze et al. | 33/559 |

FOREIGN PATENT DOCUMENTS

EP    0 392 660 A    10/1990

* cited by examiner

*Primary Examiner*—G. Bradley Bennett
*Assistant Examiner*—Amy Cohen Johnson
(74) *Attorney, Agent, or Firm*—Pearne & Gordon LLP

(57) ABSTRACT

Orientable probe (10) comprising a probe feeler (6) capable of being oriented along a plurality of indexed directions around a rotation center (O), thanks to two mobile elements (4, 5) that can turn: the first around a first axis (B) and relatively to a fixed support (3); the second around a second axis (A) and relatively to the first mobile element. The feeler (6) is fixed in a shifted position relatively to the rotation center (O).

8 Claims, 6 Drawing Sheets

ORIENTABLE PROBE

REFERENCE DATA

This application claims priority from European patent application 2004EP-103417 filed on Jul. 16, 2004, the contents whereof are hereby incorporated by reference.

FIELD OF THE INVENTION

The present invention concerns a probe for measuring three-dimensional coordinates of a mechanical piece and notably, but not exclusively, an orientable probe designed to be used on a manual or automatic coordinate measuring machine.

RELATED ART

Touch probes are measuring instruments used for example on production lines of mechanical parts, for checking dimensions or surfaces of machined parts. Touch probes are also used for capturing the three-dimensional shape of complex pieces, in order for example to reproduce or model them.

Probes generally comprise a fixed part, designed to be fastened onto the arm of a measuring machine and a mobile feeler, comprising a sphere at the end of an elongated rod and designed to be brought into contact with the piece to be measured.

In most applications, touch probes are fastened on the mobile arm of a machine whose position can be determined accurately by means of a manual or automatic measuring system, such as for example position encoders placed on the axes of the machine. The mobile is moved in space until the probe's measuring feeler comes into contact with the piece or the surface to be measured. During contact, a deflective force is then applied on the feeler, moving it away from its initial resting position. A sensor reacts to the slightest displacement of the feeler, generating an electric signal that is sent either to the user, in the form of a light signal, or to the machine's control software which thus determines, on the basis of the data of the measuring system, the coordinates of the contact point within a given reference frame. For this purpose, the prior art uses electromechanical or optical sensors or movement sensors based on different principles, for example sensors comprising constraint gauges.

In the case of a three-dimensional touch probe, the connection between the feeler and the probe's fixed part is usually realized according to the principle of the Boys connection, i.e. for example by three cylindrical pins resting on six spheres so as to define six contact points between the fixed organ and the feeler. Two- and one-dimensional probes are however also known.

When the probe is used for measuring pieces of complex shape, having cavities and protuberances, it is difficult or even impossible to bring the feeler into contact with the entire surface of the piece without the probe's fixed part or the feeler's rod interfering with elements of the piece to be measured. To remedy this inconvenience, probes are known that allow the contact feeler to be oriented in a plurality of directions in space. Generally, two independent rotation axes are required to cover all the possible orientations. A probe of this type is described in European patent application EP0392660.

Use of this type of devices is however not limited to contact feelers and they can also be used with probes without contact, for example video cameras, for inspecting and checking machined parts for example.

The rotation axes are preferably indexed, meaning that a sufficiently large but finite number of predetermined and accurately reproducible resting positions are provided. This arrangement avoids the measuring machine having to be re-calibrated after each change in orientation of the feeler.

One limitation of known orientable probes is that the device for orienting the probe always comprises an increase of the probe's size in comparison with a non-orientable probe. Thus, the useful travel range of the measuring machine in the three coordinated axes, and notably in the Z axis, will be reduced.

In particular, it is difficult to measure the coordinates of points close to the ends of the measuring machine's travel range or in pieces of complex shape, by reason of the space requirements of the probe itself.

DESCRIPTION OF THE INVENTION

One aim of the present invention is to propose a probe free of the disadvantages of the prior art and, in particular, to avoid limitations linked to the space requirements of the known orientable probes.

These aims are achieved by the device being the object of the main claim, and notably by an orientable probe for orienting a probe feeler relatively to a measuring apparatus comprising: a support element; a first mobile element connected to said support element capable of turning around a first axis relatively to said support element; a second mobile element connected with said first mobile element capable of turning around a second axis relatively to said first mobile element; a probe feeler, of elongated shape, united with said second mobile element; wherein said probe feeler can be translated relatively to said support element.

BRIEF DESCRIPTION OF THE DRAWINGS

The present invention will be better understood by reading the description given by way of example and illustrated by the attached figures in which.

EMBODIMENT(S) OF THE INVENTION

Figure 1:
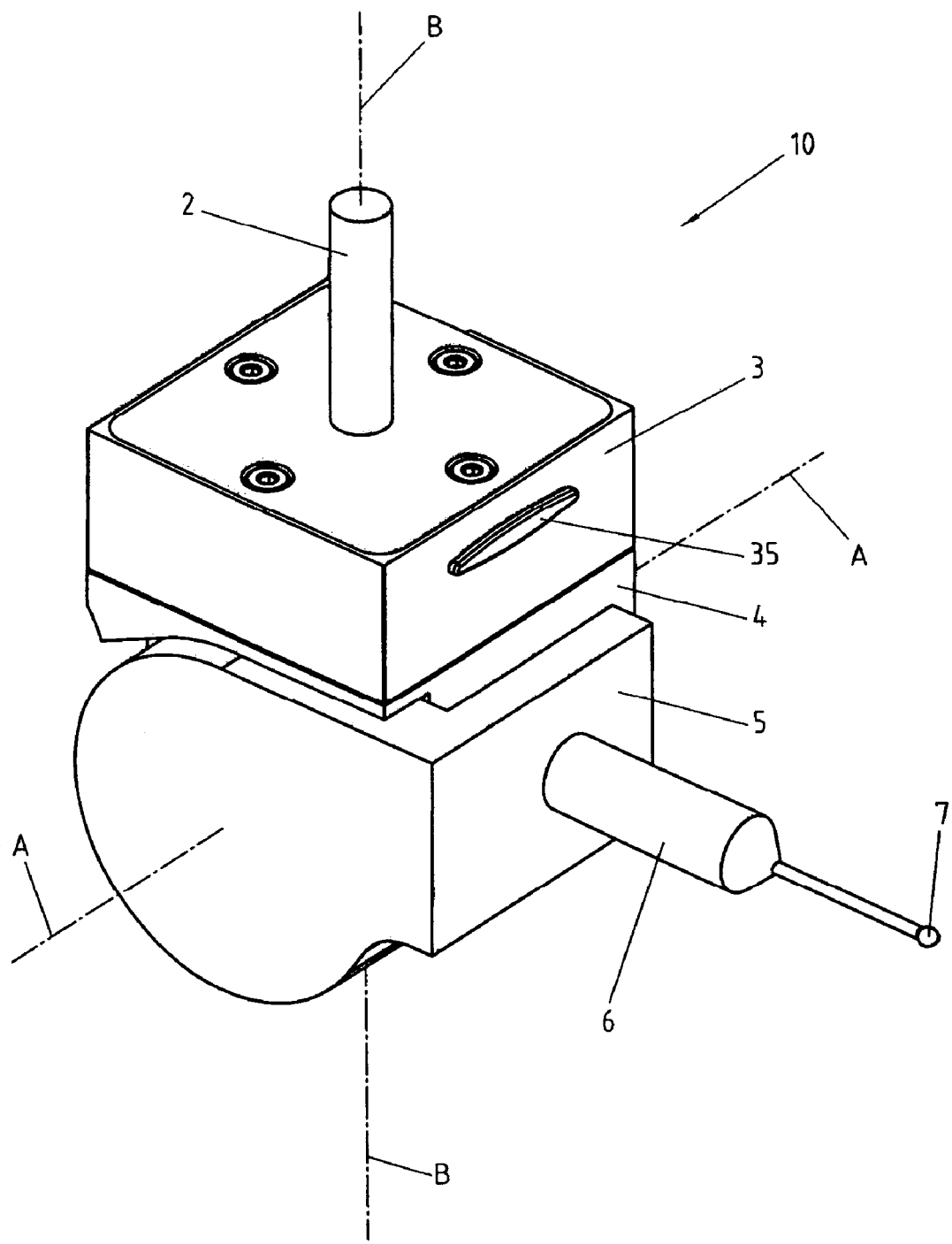
FIG. 1 a view of an orientable probe according to the invention.

With reference to FIG. 1, an orientable probe 10 according to the invention comprises a support 3 designed to be fastened on the arm of a measuring machine, capable of moving, for example along three axes of coordinates X, Y and Z inside a measuring volume. It can be fastened for example by the rod 2 or by any other fastening means.

Hereinafter, for the sake of simplicity, the designation "vertical" will be used for referring to the orientation of the axis B in FIG. 1. This designation refers to the conventional orientation of the figures and also to the orientation in which the inventive device is normally used and usually coincides with the direction of the vertical axis Z of the measuring machine onto which the probe is mounted. However, the probe can be used with any orientation in space.

A first mobile element 4 is fastened to the support 3, so as to be able to turn around the vertical axis B. The first mobile element 4 can preferably take up a plurality of indexed positions, corresponding to multiples of a small predetermined angle, for example 10 degrees. In known fashion, these indexed positions are determined for example by an isostatic connection defining six resting points between positioning elements whose position is determined with great accuracy.

In one embodiment of the invention, the rotation of the mobile element 4 is not indexed and can take up any continuous angle value.

The rotation of the first mobile element 4 can be ensured by electromechanical actuators, for example direct current motors or stepper motors or by another other actuating means. The rotation can also be manual through the intervention of an operator.

In one embodiment of the invention, an angle encoder allows the rotation angle around the axis B to be read. The encoder and the motor are preferably connected and form a servomotor.

The second mobile element 5 is free to turn around the horizontal axis A united with the first mobile element 4. The rotation of the second mobile element 5 around the axis A can be continuous or indexed, motorized or manual, as for the first mobile element 4 above.

The rotation of the second mobile element 5 along the axis A preferably covers an angular area greater than 90 degrees, preferably an angular area greater than 120 degrees, even more preferably an angular area not lesser than 180 degrees.

A probe feeler 6 is fastened to the second mobile element 5 and bears, at its extremity, a sphere 7 designed to come into contact with the piece to be measured. A detection mechanism, not represented, thus responds to the slightest displacement of the sphere 7 with an electric signal that is sent either to the light display 35 or to the machine's control software, by a connector (not represented).

Figure 2:
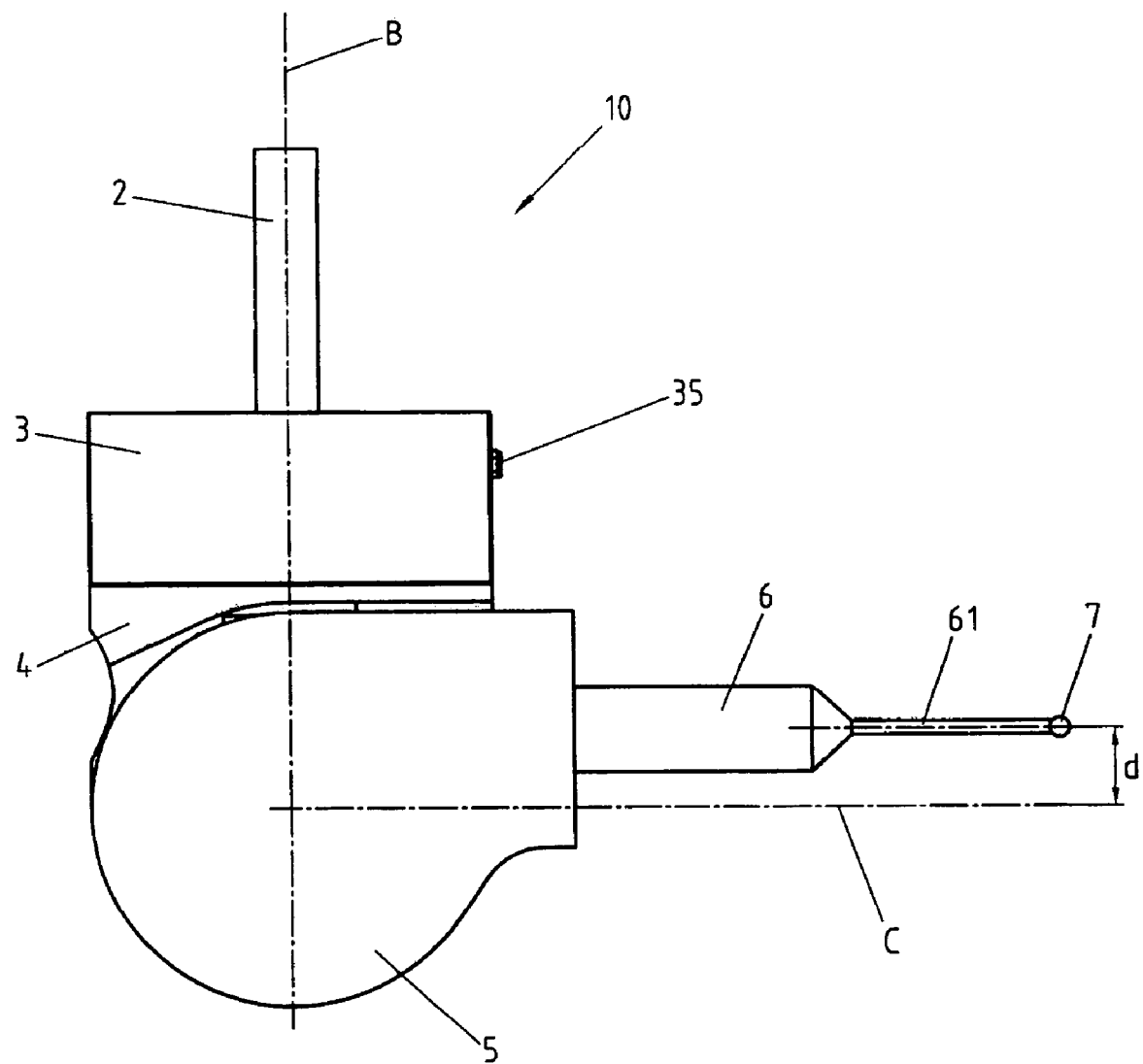
FIGS. 2, 3 and 4 show respectively a first, second and third position of the probe of FIG. 1.

With reference to FIG. 2, following the rotations around the axes A and B, the feeler 6 and the sphere 7 can take up a plurality of orientations in space relatively to the center of rotation O located at the intersection of the axes A and B.

Generally, the two axes A and B do not necessarily cross in space and the point O does not always exist.

According to one aspect of the invention, the probe feeler 6, the axis 61 of the feeler 6 and the center of the sphere 7 are not aligned with the second axis A, but are shifted, for example vertically, by a distance d relatively to the axis A of the second mobile element 5.

Figure 3:
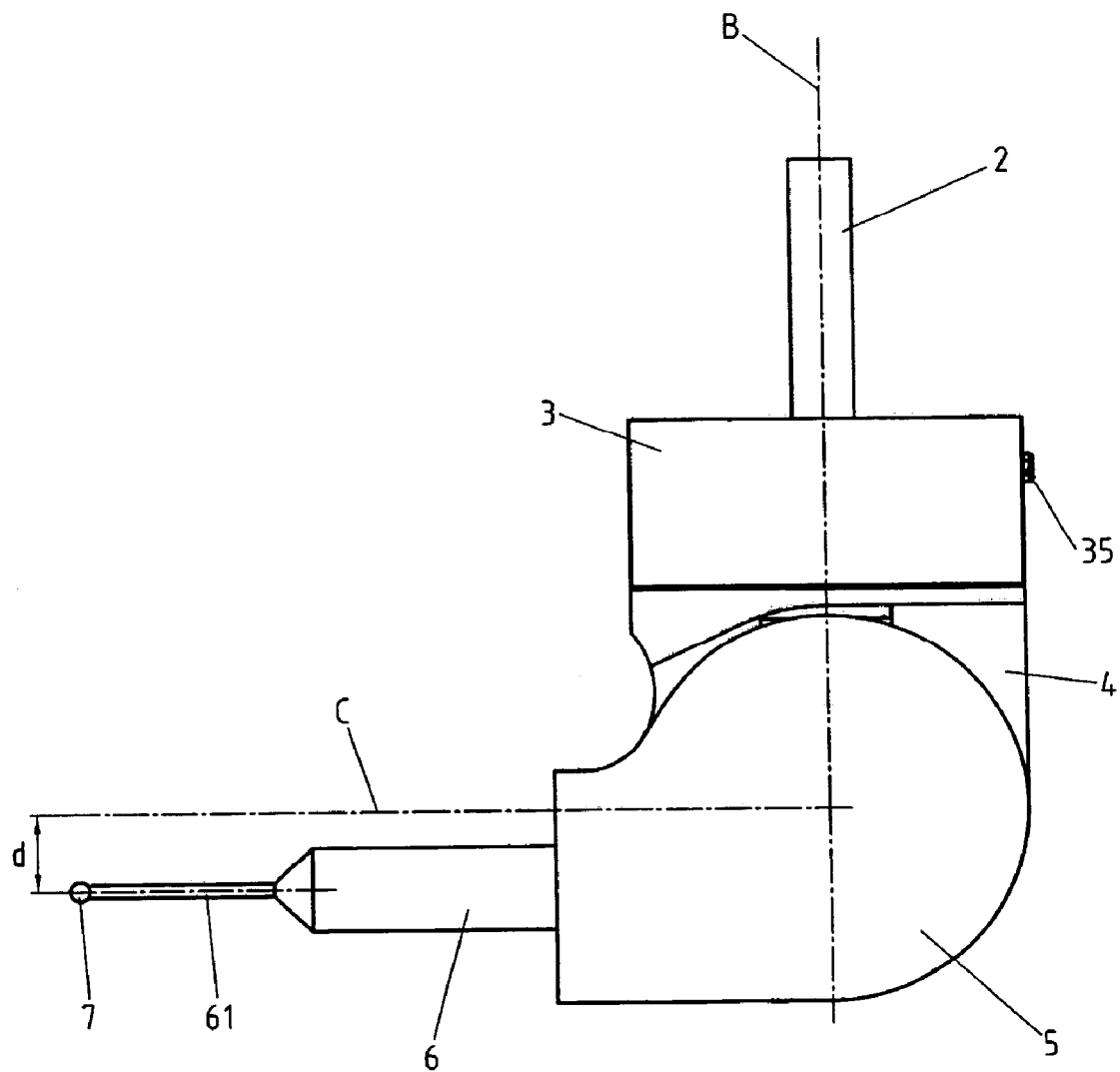
Figure 4:
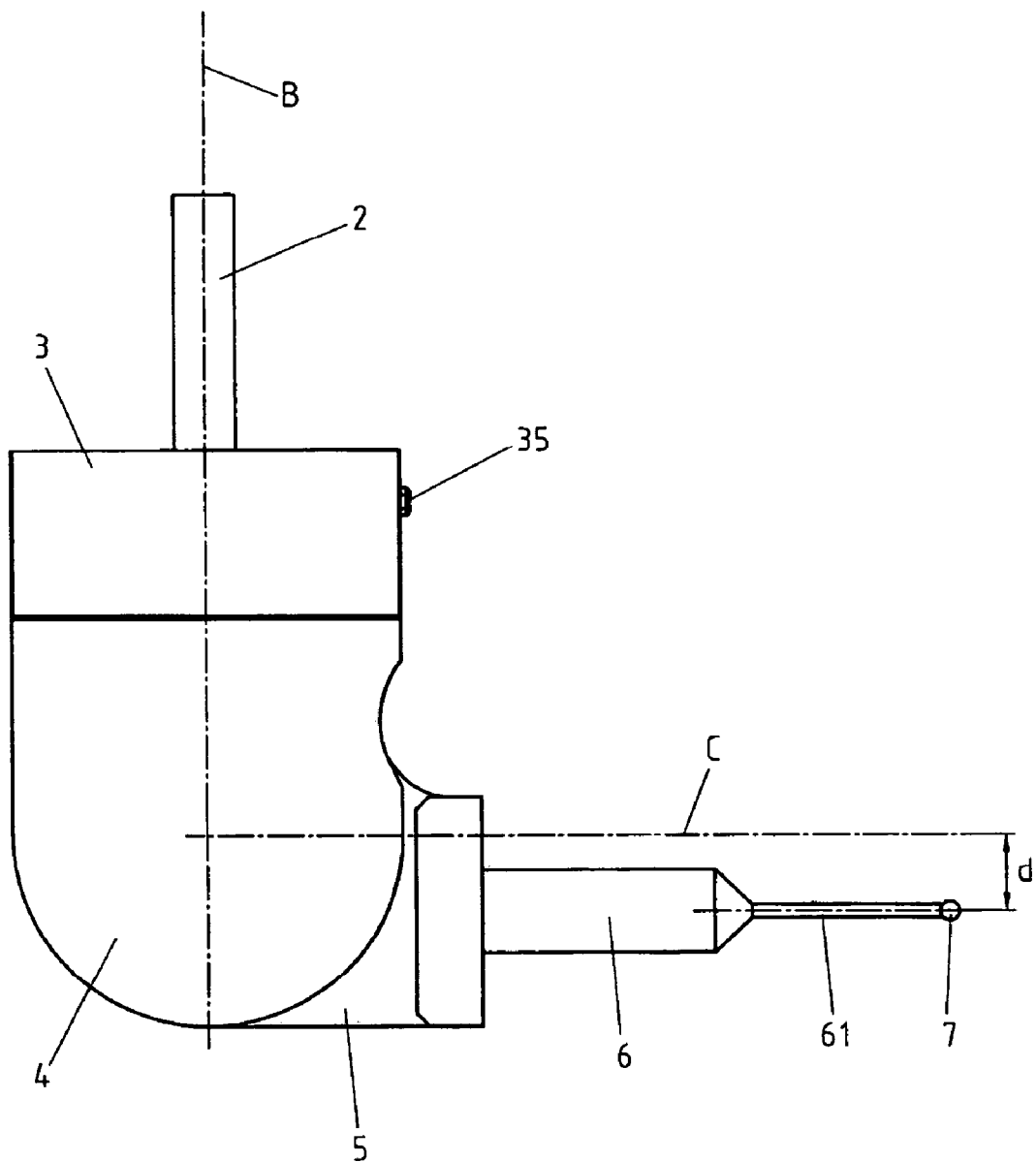

The FIGS. 2, 3 and 4 represent a sequence of rotations allowing the shift d of the probe feeler 6 to be modified, along one embodiment of the invention. FIG. 2 represents a probe according to the invention with the probe feeler placed horizontally. The feeler 6 is shifted upwards by a distance d. This configuration is advantageous when it is necessary to measure points close to the upper limit of the travel range in Z of the measuring machine.

FIGS. 3 and 4 represent respectively the probe after a 180 degree rotation along the axis A, from the configuration of FIG. 2, followed by a 180 degree rotation along the axis B. It can be appreciated that, at the end of the sequence, the probe feeler is oriented exactly in the same horizontal direction as in the beginning, but it is now shifted by a distance d downwards relatively to the axis A. This configuration allows for example coordinates of points located very low to be measured without the lower part of the probe risking touching the marble onto which the piece to be measured is placed.

In the configuration of FIG. 4, the probe feeler 6 is translated relatively to the starting configuration of FIG. 2 in a symmetrical situation relatively to the axis C.

According to the same principle, it would also be possible to start from an oblique orientation of the feeler 6 and perform two rotations, one along the axis A and the second along the axis B to arrive to a configuration in which the feeler's shift is different from the starting position without the horizontal and vertical orientation angles of the feeler being modified. In this case, if α is the feeler's initial angle relatively to the vertical axis, a rotation by 2α along the axis A followed by a 180 degrees rotation along the axis B will be necessary.

The inventive probe 10 thus allows the shift of the probe feeler 6 to be modified and, without modifying its orientation, to make it take up either a position displaced upwards, visible in FIG. 2, or a position displaced downwards, visible in FIG. 4. In this manner, the useful travel range in Z of the measuring machine is increased by a quantity 2d.

Figure 6:
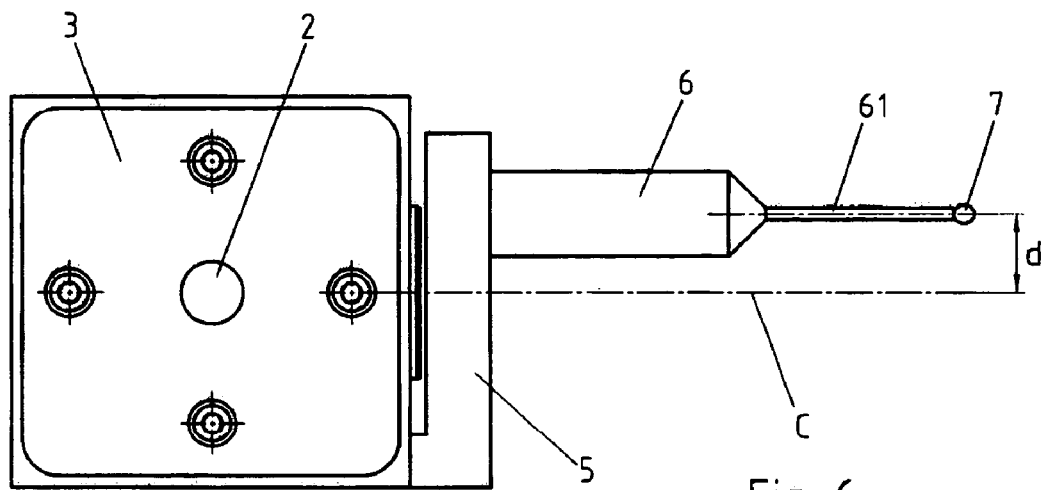
FIGS. 6, 7 and 8 show three configurations of the probe of FIG. 1.
Figure 7:
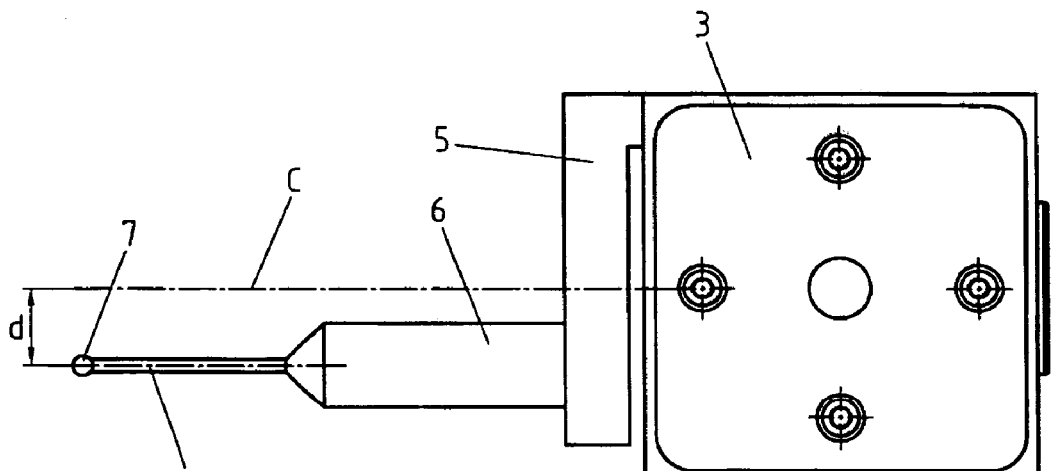
Figure 8:
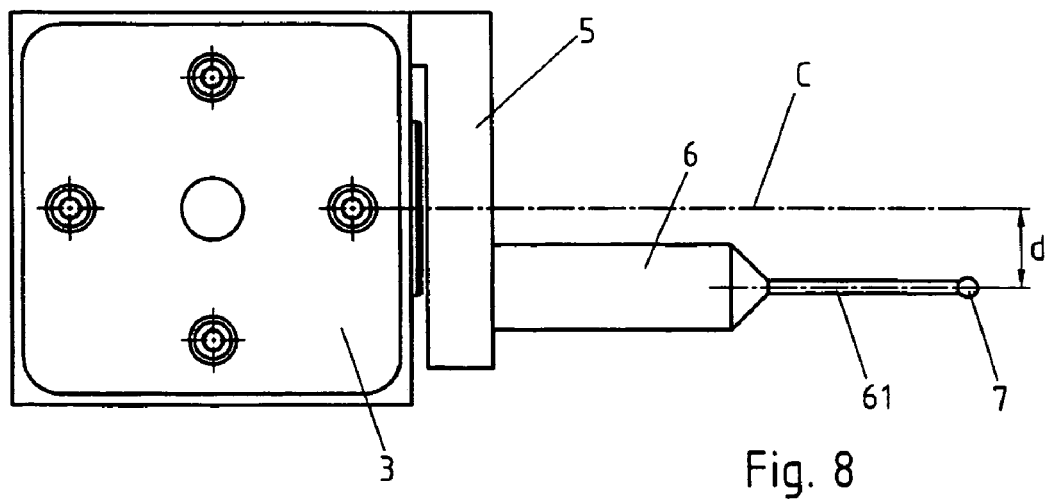

With reference to FIGS. 6, 7 and 8, the same principle can be applied to a probe feeler shifted horizontally by a quantity d relatively to the axis C and relatively to the first axis B. FIG. 6 shows an example of an starting configuration in which the feeler 6 is shifted by a distance d in the direction of the increasing coordinates Y for example.

A 180 degrees rotation along the axis B allows the configuration of FIG. 7 to be achieved. After a subsequent 180 degrees rotation along the axis A, the feeler 6 returns to its initial orientation but it is now shifted by a distance d in the direction of the decreasing coordinates Y, as visible in FIG. 8.

Even though the represented figures and examples refer to a probe feeler provided with a symmetry axis 61 parallel to the axis C of the second mobile element, the present invention also includes the case of an asymmetric or oblique probe feeler in which the element designed to contact the piece to be measured, for example the sphere 7, is shifted relatively to the axis C.

Another embodiment of the invention will now be described with reference to FIG. 5.

Figure 5:
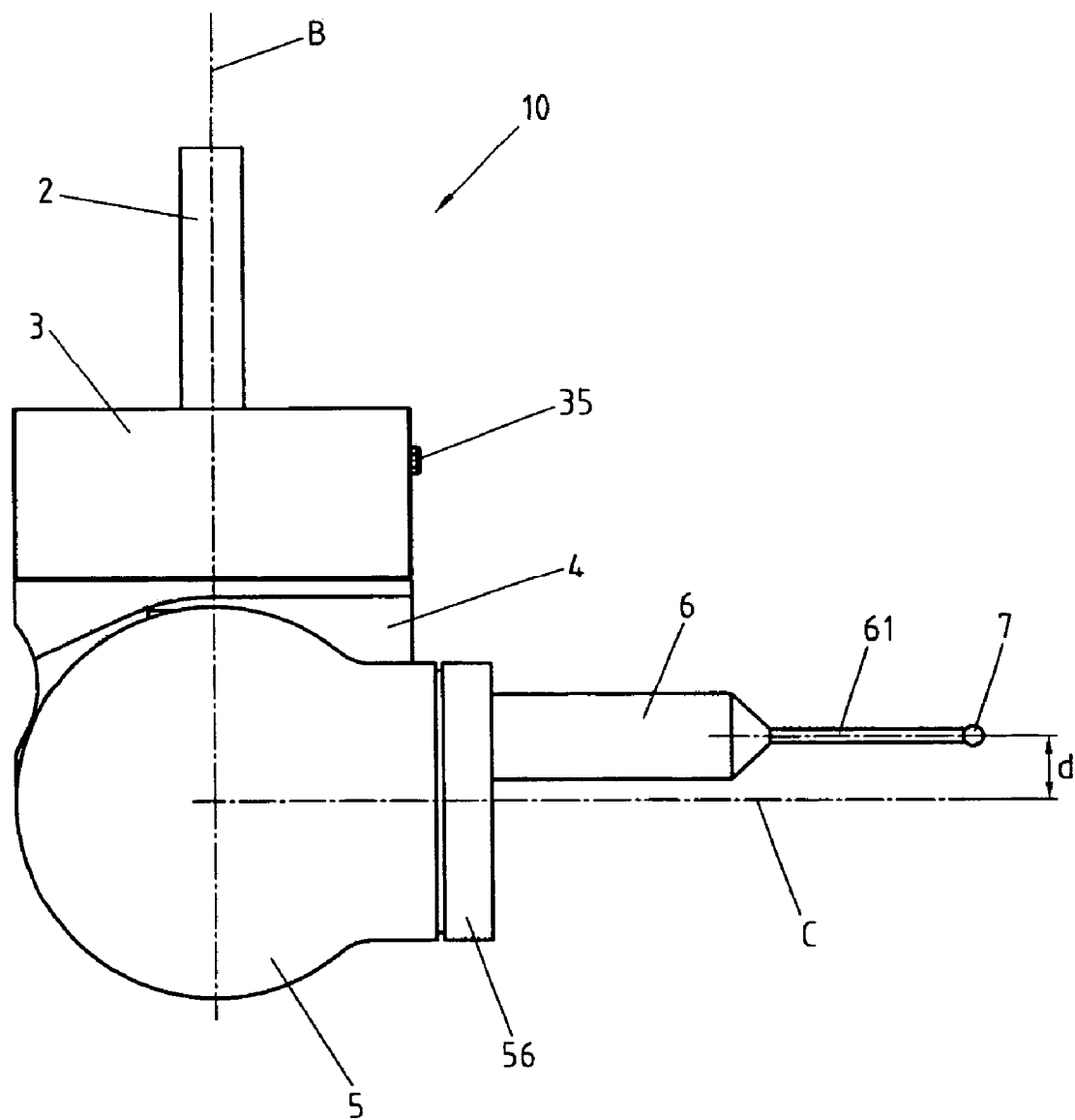
FIG. 5 represents an embodiment of the inventive probe.

In the inventive probe represented in FIG. 5, the probe feeler 6 is fastened to a rotating plate 56 that can turn around the axis C. In this manner, it is possible to modify the shift of the probe feeler 6 by rotating the plate 56. Preferably, the plate 56 allows a certain number of indexed positions, analogously to the mobile elements 4 and 5, for example two positions corresponding to a vertical shift on either side of the axis C and two positions corresponding to a horizontal shift.

The rotation of the plate 56 can be ensured by a motor, or another actuator, directly controlled by the measuring machine's software, or can be performed manually by an operator.

In an embodiment, not represented, of the invention, the probe feeler 6 is fastened to a sliding support capable of sliding between the extreme positions on the mobile element 5 corresponding to two different shifts of the probe feeler. Other manual or motorized displacement means are also possible and are comprised within the present invention.

In an embodiment, not represented, of the invention, the shifting of the probe feeler is achieved by interposition, between the second mobile element 5 and the probe feeler 6, of a removable shifting implement. The shifting implement includes for example a rotating plate, analogously to the embodiment of the invention represented in FIG. 5, or a sliding element, for varying the shift.

In another embodiment, a fixed shifting implement is interposed between the second mobile element 5 and the probe feeler 6. In this case, the shift variation is achieved by a composition of rotations, as for the embodiment represented in FIGS. 2, 3 and 4.

The invention claimed is:

1. A method for measuring coordinates of points by a coordinate measuring machine equipped with an orientable probe which comprises:

a support element fastened to a mobile arm of the measuring machine;

a first mobile element connected with said support element and capable of turning around a first axis relative to said support element;

a second mobile element connected with said first mobile element capable of turning around a second axis relative to said first mobile element; and a probe feeler, of elongated shape, united to said second mobile element;

the method comprising the steps of:

positioning and orienting the probe feeler according to an initial position and an initial direction in space;

performing partial rotations of said first mobile element and second mobile element, wherein the probe feeler takes up a position shifted a distance in a direction of a vector parallel to said first axis from the initial position, thereby resulting in said probe feeler being oriented in said initial direction bringing the feeler in contact with a point to measure the coordinates of the point.

2. The method of claim 1, wherein said probe feeler is shifted relative to said second axis.

3. The method of claim 2, wherein the rotation of said second mobile element around said second axis covers an angular area greater than 90 degrees, but not less than about 180 degrees.

4. Orientable probe for orienting a probe feeler relative to a measuring apparatus, said orientable probe including:

a support element;

a first mobile element connected with said support element and capable of turning around a first axis relative to said support element;

a second mobile element connected with said first mobile element capable of turning around a second axis relative to said first mobile element; and a probe feeler, of elongated shape, united to said second mobile element in a fixed manner;

said probe feeler being shiftable in a direction of a vector parallel to said first axis by partial rotations of said first mobile element and second mobile element.

5. The orientable probe of claim 4, wherein said orientable probe is also adapted such that when the probe feeler is positioned and oriented according to an initial position and an initial direction in space, said probe feeler can be positioned to be displaced from the initial position without modifying the initial direction of the probe feeler.

6. The orientable probe of claim 4, wherein the rotation of said second mobile element around said second axis covers an angular area greater than 90 degrees, but not less than about 180 degrees.

7. The orientable probe of claim 4, wherein said shift can be varied by positioning said probe feeler in one of two symmetric positions relative to an axis of said second mobile element.

8. The orientable probe of claim 4, wherein said probe feeler comprises a rod with, at one extremity, an element designed to contact a piece to be measured, and wherein an axis of said rod is shifted relative to said second axis.

* * * * *